(12) United States Patent
O'keeffe et al.

(10) Patent No.: US 8,340,021 B2
(45) Date of Patent: Dec. 25, 2012

(54) WIRELESS COMMUNICATION UNIT

(75) Inventors: Conor O'keeffe, Cork (IE); Paul Kelleher, Aherla (IE)

(73) Assignee: Freescale Semiconductor, Inc., Austin, TX (US)

( * ) Notice: Subject to any disclaimer, the term of this patent is extended or adjusted under 35 U.S.C. 154(b) by 380 days.

(21) Appl. No.: 12/602,783

(22) PCT Filed: Jun. 13, 2007

(86) PCT No.: PCT/IB2007/052239
§ 371 (c)(1),
(2), (4) Date: Dec. 3, 2009

(87) PCT Pub. No.: WO2008/152455
PCT Pub. Date: Dec. 18, 2008

(65) Prior Publication Data
US 2010/0177690 A1    Jul. 15, 2010

(51) Int. Cl.
*H04W 88/02* (2009.01)
*G06F 15/16* (2006.01)
(52) U.S. Cl. .......................... 370/328; 709/247
(58) Field of Classification Search .................. 370/328, 370/335, 338, 342; 709/247
See application file for complete search history.

(56) References Cited

U.S. PATENT DOCUMENTS

| | | |
|---|---|---|
| 5,839,110 A | 11/1998 | Maeda et al. |
| 2002/0147584 A1* | 10/2002 | Hardwick ..................... 704/229 |
| 2006/0078041 A1 | 4/2006 | Uchiyama et al. |
| 2007/0086601 A1* | 4/2007 | Mitchler ......................... 381/79 |
| 2007/0116046 A1* | 5/2007 | Liu et al. ....................... 370/466 |
| 2008/0075154 A1* | 3/2008 | Rofougaran .................. 375/222 |
| 2008/0123731 A1* | 5/2008 | Wegener ....................... 375/240 |
| 2008/0125060 A1* | 5/2008 | Lin et al. ....................... 455/126 |
| 2008/0240013 A1* | 10/2008 | Johnson et al. ............... 370/315 |

FOREIGN PATENT DOCUMENTS

| | | |
|---|---|---|
| EP | 0595406 A | 5/1994 |
| JP | 2003234658 A | 8/2003 |
| KR | 20050015823 A | 2/2005 |

OTHER PUBLICATIONS

International Search Report and Written Opinion correlating to PCT/IB2007/052239 dated Feb. 8, 2008.

* cited by examiner

*Primary Examiner* — Brian D Nguyen

(57) ABSTRACT

A wireless communication unit includes a baseband module and a radiofrequency module. A communication interface connects the baseband module to the radiofrequency module. Data can be communicated from the baseband module to the radiofrequency module and/or vice versa via the interface. The communication interface includes one or more data compression arrangement, for compressing original data to be transmitted over the communication interface, from a transmitting side of the communication interface to a receiving side of the communication interface, into compressed data and decompressing the compressed data after transmission and restoring the original data. The data compression arrangement may include a data compression unit at the transmitting side of the communication interface, and a data decompression unit at the receiving side of the communication interface.

19 Claims, 4 Drawing Sheets

WIRELESS COMMUNICATION UNIT

FIELD OF THE INVENTION

This invention relates to a wireless communication unit, a baseband module, a radio frequency module, a wireless terminal and a computer program product.

BACKGROUND OF THE INVENTION

Wireless communication devices, such as mobile phone handsets, typically incorporate a number of distinct and operably coupled sub-systems, in order to provide the wide variety of functions and operations that a complex wireless communication device needs to perform. Interfaces are defined for communicating between the respective sub-systems.

Such sub-systems may include radio frequency power amplification functions, radio frequency integrated circuits comprising radio frequency generation, amplification, filtering logic, etc. as well as baseband integrated circuits (BBIC) comprising audio circuits, encoding/decoding, (de)modulation functions, processing logic, etc. and memory units. Typically, the baseband integrated circuits are provided as one or more baseband modules that can be operably coupled to one or more RF modules in which the BB integrated circuit is implemented.

Wireless communication devices typically have to comply with a communication standard, such as for example one or more of those named Global System for Mobile communication (GSM), General Packet Radio Service (GPRS), Universal Mobile Telephone Service (UMTS) and others. Such standards inter alia prescribe the bandwidth for the data exchange between the baseband module and the RF module. However, on the one hand the requirements on this RF to BB interface are consistently increasing with new generations of protocols, thereby increasing the power consumption and the risk of radio frequency interference. Low power consumption and low interference are, on the other hand, typically required for the wireless communication devices. Thus, conflicting requirements are imposed.

SUMMARY OF THE INVENTION

The present invention provides a wireless communication unit, a baseband module, a radio frequency module, a wireless terminal and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
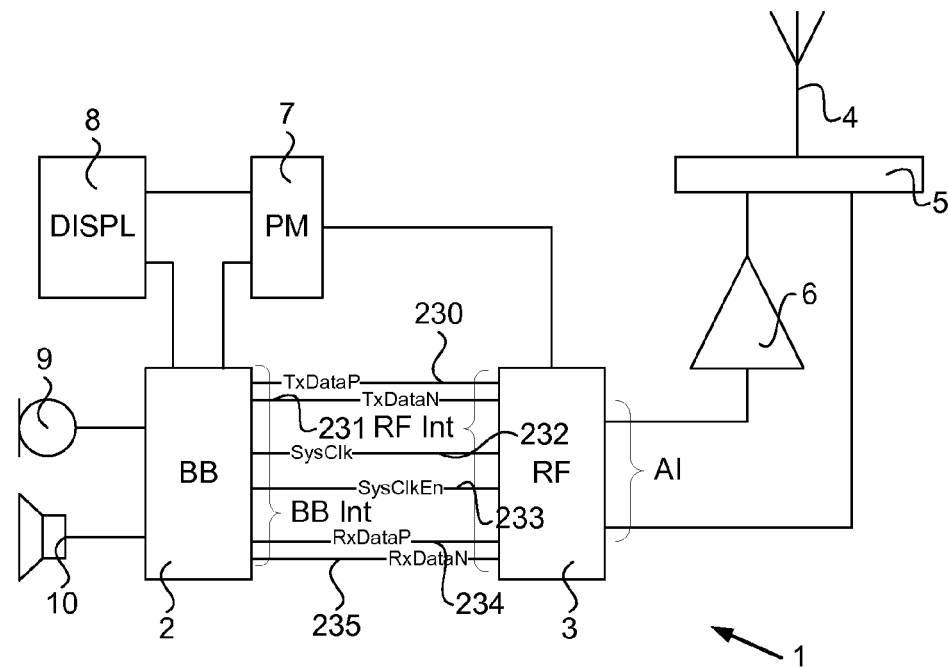
FIG. 1 schematically shows an example of an embodiment of a wireless communication device.

Referring first to FIG. 1, there is shown a simplified block diagram of a part of a wireless communication device 1. The wireless communication device 1 may for example be a multi-mode protocol mobile telephone or other wireless terminal which can be connected via a wireless connection to a (tele-)communications network in order to exchange data, video and/or speech. As shown, the wireless communication device 1 may contain a baseband (BB) module 2 and a radio frequency (RF) module 3. The BB module 2 may perform a number of data processing operations and/or signal processing operations at baseband frequencies. The radio frequency (RF) module 3 may perform a number of signal processing operations, such as converting baseband signals from or to RF signals, filtering signals and/or modulating signals. A voltage regulator (not shown) associated with the RF module 3 may be part of a power management (PM) module 7, with the BB module 2 maintaining control of the power management (PM) module 7.

An antenna 4 may be coupled, via a 3G duplex filter and/or antenna switch 5, to an antenna interface AI of the RF module 3. RF signals may be received from and/or transmitted to a wireless communication channel at the antenna 4. The antenna switch 5 may provide isolation between receive and transmit chains within the wireless communication device 1.

The receiver chain may, as explained below in further detail while referring to the examples of FIGS. 2 and 3, include numerous receiver circuitries, from hereon commonly referred to as the RF receiving unit, on the RF module 3, such as receiver front-end circuitry providing reception, filtering and intermediate or direct frequency conversion from an RF frequency to a baseband frequency. The receiver chain may further include circuitry on the baseband device 2, from hereon commonly referred to as the baseband receiving unit for example to process baseband signals received from the RF module in order to output information, such as data, video and/or speech, represented by the signals in a for humans perceptible form, for example on output devices connected to the baseband device 2, such as at a display 8 or a speaker 10. The baseband signals may for example be digital signals which represent the inputted information (and optionally other information) in a digital form.

The transmit chain of the wireless communication device 1 may include one or more input devices, such as a microphone 9 and/or keypad (not shown), coupled to the BB module 2, via which information, such as data, video and/or speech, may be presented to the BB module 2.

The transmit chain may include circuitry in the BB module, from hereon commonly referred to as the baseband transmission unit, which generates baseband signals representing the information. The baseband signals may for example be digital signals which represent the inputted information (and optionally other information) in a digital form.

The transmit chain may further include circuitry in the RF module, from hereon commonly referred to as the RF transmission unit. The RF module in a transmit function may be coupled to a radio frequency power amplifier 6 and thereafter to the antenna 4, in this example via the antenna switch or duplex filter 340. Signals inputted at the input device may be processed by the BB module and be transmitted at baseband frequency to the RF module. The RF module may then convert the received baseband signals into signals at radio frequency which are suitable to be transmitted, optionally after being subjected to further operations such as power amplification, via the antenna 4, over a wireless connection.

As shown in FIG. 1, the RF module 3 may be communicatively connected to the BB module 2. The wireless communication unit 1 may include a communication interface with the baseband module 2 at a baseband side BB Int thereof and the RF module at a radiofrequency side RF Int of the communication interface. Via the communication interface, signals can be exchanged between the baseband module 2 and from the RF module 3, e.g. in the direction from the baseband module 2 to the RF module 3 and/or vice versa.

Figure 2:
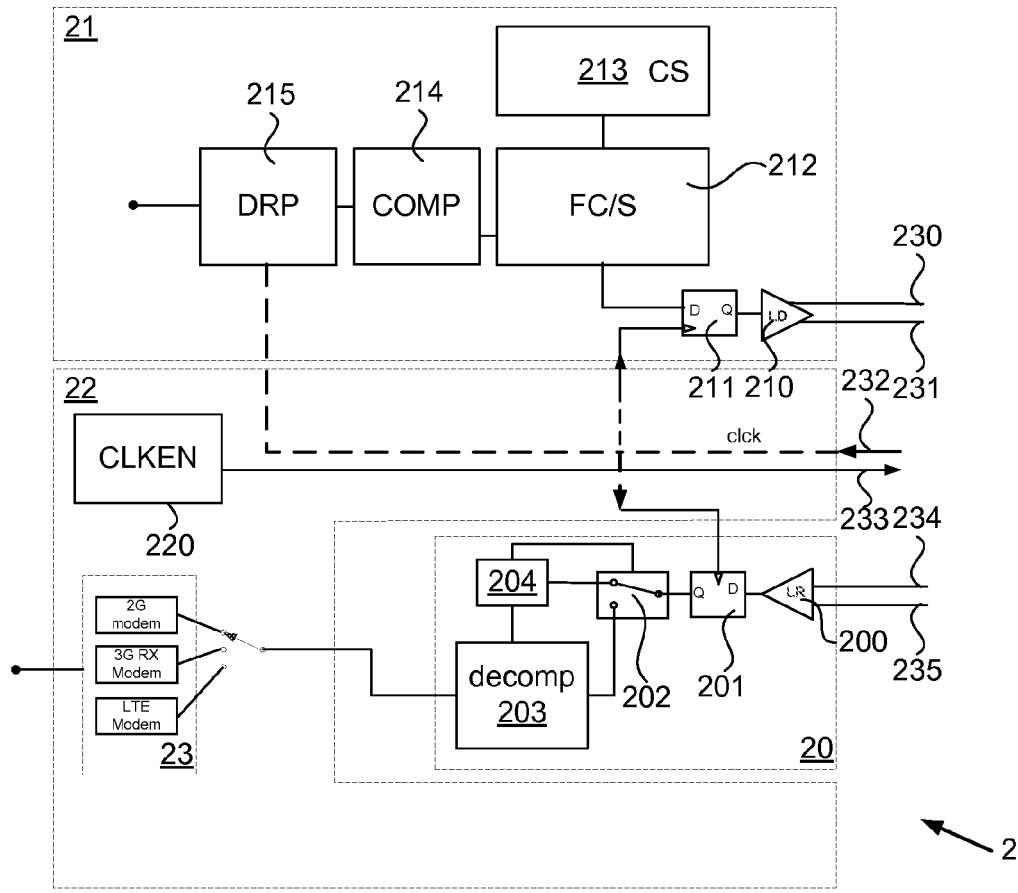
FIG. 2 schematically shows an example of an embodiment of a baseband module, which can be used in the example of FIG. 1.
Figure 3:
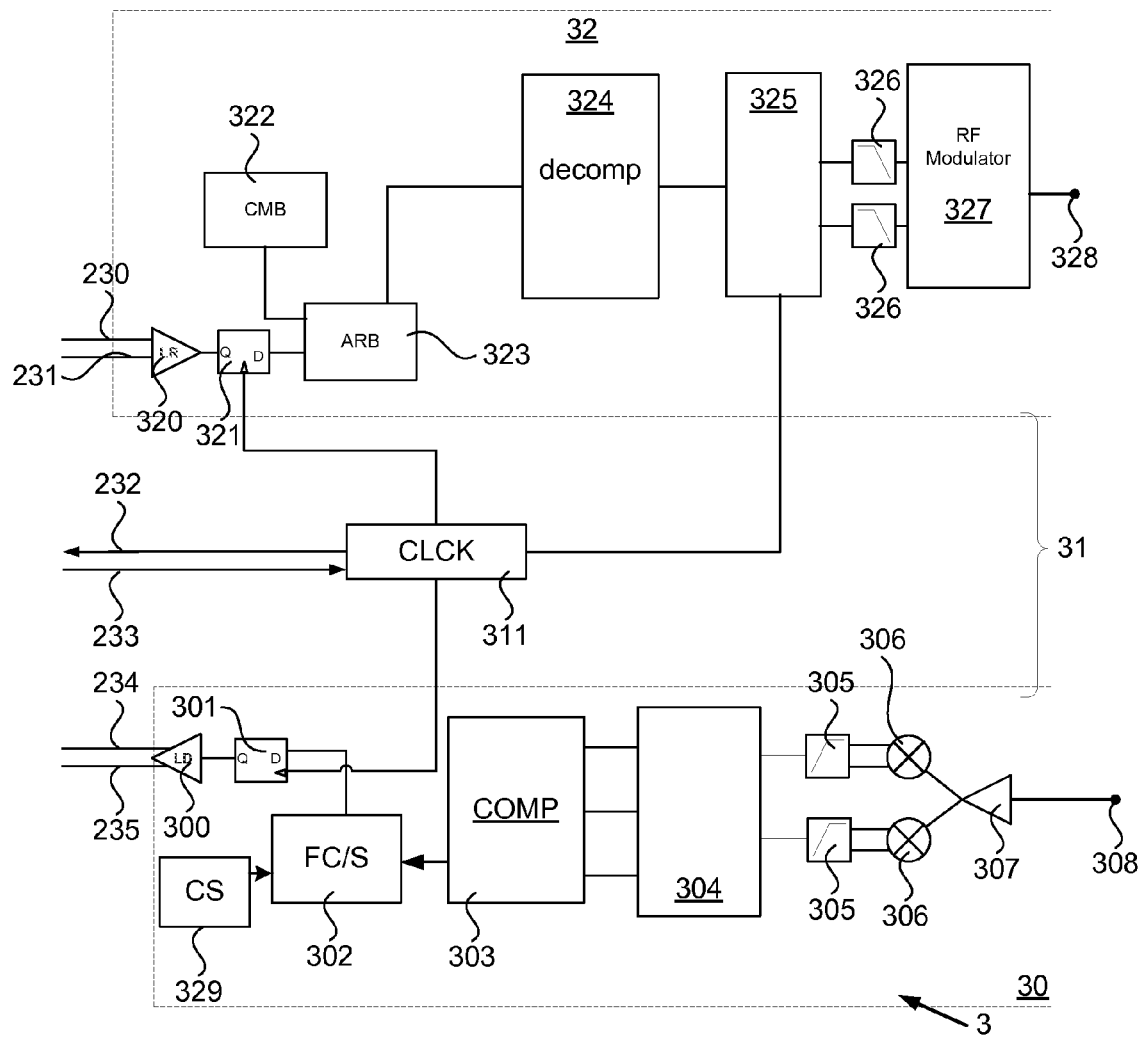
FIG. 3 schematically shows an example of an embodiment of a radiofrequency module, which can be used in the example of FIG. 1.

As illustrated in FIGS. 2 and 3 in more detail, the communication interface may include a data compression arrangement. As shown in FIGS. 2 and 3, the data compression arrangement may include a compression unit 214, 303 at one side of the interface and a data decompression unit 203,324 at another side of the interface. The data compression arrangement may be arranged to compress original data (which is to be transmitted from a transmitting side of the communication interface to a receiving side of the communication interface, e.g. from the BB module 2 to the RF module 3 or vice versa) into compressed data at the transmitting side of the interface and decompress the compressed data after transmission and restore the original data at the receiving side of the interface.

Thereby, the opposing requirements of a large bandwidth, low power consumption and low interference may be concealed.

For example, the data throughput over the communication interface may be relatively large while the bandwidth of the communication interface is relatively limited. Also, for example the data throughput may be increased while the real bandwidth and the data rate of the communication interface remain stable. Hence, for instance, the data throughput may be increased while the power consumption may have a limited increase, remain stable or may even be reduced. Also, since the real bandwidth may be relatively small, the communication interface may operate at a relatively low clock frequency and hence the risk of interference may be limited.

The data compression arrangement may be implemented in any manner suitable for the specific implementation. As shown in FIGS. 2 and 3, for example, the wireless communication unit 1 may include two or more data compression arrangements. For example, a first data compression arrangement may be provided for compressing original data to be transmitted over the communication interface from the baseband side to the radiofrequency side into compressed data and decompressing the compressed data after transmission and restoring the original data. In FIGS. 2 and 3, for example, a baseband data compression unit 214 is provided in the baseband module 2 and an RF data decompression unit 324 in the RF module is communicatively connected to the data compression unit 214.

A second data compression arrangement may be provided for compressing original data to be transmitted over the communication interface from the radiofrequency side to the baseband side into compressed data and decompressing the compressed data after transmission and restoring the original data. In FIGS. 2 and 3, for example, an RF data compression unit 303 is provided in the RF module 3 and a baseband data decompression unit 203 in the BB module 2 is communicatively connected to the RF data compression unit 303.

The communication interface may be implemented in any manner suitable for the specific implementation. As shown in the examples, the baseband side BB Int and the radiofrequency side RF Int may for instance both include a number of pins, for instance six pins or eight pins, to carry electrical signals there between. The pins may for example be connected to different electrical paths, such as a separate transmission path and receiving path and/lines. The paths may for instance include a differential transmission path including TxDataP line 230, TxDataN line 231, a differential receiving path including RxDataP line 234, and RxDataN line 235, a single ended SysClk line 232 and a single ended SysClkEn line 233. However, e.g. depending on the communication protocols to comply with, other pins and lines may be provided. For example, the SysClk Signal line 232 may be differential rather than single ended.

The baseband module 2 may be implemented in any manner suitable for the specific implementation. Referring now to FIG. 2, a block diagram of an example of a baseband module 2 is shown. As shown, the baseband module 2 may include a baseband transmission unit 21, for transmitting baseband signals to the RF module 3. The baseband module 2 may include a baseband receiving unit 20 for receiving signals from the RF module 3. The signals exchanged between the baseband interface and the radio frequency interface may for example be digital signals and hence represent binary data.

The baseband module 2 may further include a baseband timing unit 22, which together with an RF timing unit 31 in the RF module 3 forms a clock system. As shown in FIGS. 2 and 3, for example, a common clock source 311 of the common clock signal may be included in the radio frequency module 3. In this example, the clock source 311 is connected to the SysClk line 232 and can provide a clock clck to the baseband module via the SysClk line 232. The baseband module 2 includes a clock enable block 220 which can generate a SysClkEn signal. The clock enable block 220 is connected to the SysClkEn line 233 and can output the SysClkEn signal to the line 233. The clock source 311 is connected to the receiving side of the SysClkEn line 233, with a control input. The clock source 311 starts generation of the clock signal transmitted to the baseband module 2 in response to the SysClkEn signal.

In another embodiment, the common clock source may be included in the BB module 2. The BB module 2 and the RF module 3 may also each be provided with a separate clock source.

As shown in FIG. 2, the units 20-22 are connected to respective lines 230-235 at the baseband side of the communication interface of the baseband module 2, via which the units 20-22 can receive and/or output signals from/to the baseband interface of the RF module 3.

The units 20-22 may, as shown in FIG. 2, include at the respective connection to the lines 230-235 a line driver 210 or a, line receiver 200. For example, in the receiving unit 20, the line receiver 200 may be connected with an input to the respective lines and with an input of a latch 201. In the transmitting unit 21, the line driver 210 may be connected with an output to the respective lines 230,231. An input of the line driver 210 may be connected to an output of a latch 211. In FIGS. 2 and 3, the latches are implemented as D-flipflops. The latches synchronise the data presented at the latch input (denoted D in the figure) with a respective clock signal clck and output at the latch output (denoted Q in the figure) the data presented at the latch input synchronised with the clock signal clck.

With respect to the receiving unit 20, the latch 201 may be connected to a data decompression unit 203 which can decompress the received compressed data 201 and hence restore the original data. The data decompression unit 203 may output the restored data to a baseband modem unit 23, for example when a predetermined condition is fulfilled. The data decompression unit 203 may, for example, output the restored data when all the data of a data packet have been received and decompressed.

The baseband modem unit 23 may include a selection mechanism for selecting a baseband modem suitable for the communication mode. As shown, the baseband modem 23 may be positioned, in a data processing direction, downstream of the data decompression unit 203. As explained further below in more detail, the wireless communication unit 1 may have two or more different communication modes. In each of communication modes, the wireless communication unit 1 can communicate with a different type of wireless communication network. The communication modes may be any communication mode suitable for the specific implementation. For example, in the different communication modes, the wireless communication unit 1 may operate in manner compatible or complying with a different communication protocol. The communication protocol may for example be a telecommunication protocol, such as for instance a second generation (2G) mobile communication protocol such as CDMA or GSM, a 2.5G mobile communication protocol such as EGPRS, a $3^{rd}$ generation mobile communication protocol such as UMTS, or WCDMA, or a $4^{th}$ generation mobile communication protocol, such as Long Term Evolution (LTE), WiMax or WiBro. The communication protocol may for example be a data communication protocol such as for a wireless local area network or a metropolitan area network, for instance a protocol in the IEEE 802 series, such the WiMax (Worldwide Interoperability for Microwave Access) or WiBro (Wireless Broadband) protocols. For instance, the communication modes may include modes in which the specific communication protocol complied with may include one or more of the group consisting of CDMA, EGPRS and WCDMA, WiMax, WiBro, LTE, WiFi, 802.11 series, (Wideband) Universal Serial Bus and future 4G standards. As shown in FIG. 2, the baseband modem unit 23 may for example include a 2G receiver modem, a 3G receiver modem and a LTE receiver modem for the different communication modes. However, the baseband modem unit 23 may in addition or alternatively include other modems.

The transmission unit 21 may, as shown, include a data processing unit (DRP) 215 which may generate data to be transmitted via the wireless channel. The DRP 215 may be connected to a data compression unit 214. The data compression unit 214 may compress the data transmitted by the DRP and output compressed data to a frame constructing and/or sequencing (FC/S) unit 212 which generates data frames or data packets compliant with the communication protocol of the respective communication mode. The FC/S unit 212 may be connected, in this example via the latch 211 and the line driver 210, with an output to the transmission line at the baseband side of the communication interface. A control input of the FC/S device may be connected to a control setting unit 213 which can control settings of the frame or packet construction and sequencing performed by the FC/S device 212. For example, the control setting unit 213 may control frame or packet lengths depending on the mode, the number of bits per chip, the number of samples per frame, symbol or chip or other suitable parameters of the FC/S device.

The RF module 3 may be implemented in any manner suitable for the specific implementation. Referring to FIG. 3, the example of an RF module 3 shown therein includes for instance an RF transmission unit 32, for transmitting, via the antenna 4, data received from the baseband module 2 to the wireless connection. The RF module 3 may further include an RF receiving unit 30 for receiving, via the antenna 4, data from the wireless connection and transmitting the received signals to the baseband module 2. The RF module 3 may further include an RF timing unit 31.

As shown in FIG. 3, the units 30-32 are connected to respective lines 230-235 at the baseband interface of the RF module 3 via which the units 30-32 can receive and/or output signals from/to the baseband module 2. The receiving unit 30 and the transmission unit 32 are further connectable via a receiver contact 308 and a transmitter contact 328 respectively to the antenna 4. The units 30-32 may, as shown, include lines driver 300, line receiver 320 connected to the respective paths 230-235 between the baseband interface and the baseband side of the communication interface.

The RF receiving unit 30 may include a frequency converting unit 306. The frequency converting unit 306 may convert the frequency of the received signals, in this example by mixing the incoming signals with a local oscillator (LO) signal. As shown, a low noise amplifier (LNA) 307 may connect the frequency converting unit 306 to the receiver contact 308 in order to input signals received at the contact 308 into the frequency converting unit 306. As shown in FIG. 3, the frequency converting unit 306 may for instance include a quadrature mixer which may be connected to a (not shown) source of LO signals.

The frequency converting unit 306 may be connected via a filter unit 305 to a receiving block 304. The receiving block 304 can digitize the frequency converted signals and digitally filter the digitized signals. The receiving block 304 may for example include an analogue-to-digital converting unit (ADC), which can receive the frequency converted signals. The ADC may be connected to a selected digital filter corresponding to the used communication mode, which may be selected from one or more digital filters present in the RF module, such as a very low intermediate frequency filter (VLIF) suitable for a 2G communication mode, a Square Root Raised Cosine (SRRC) filter for a 3G communication mode or a filter for a long term evolution mode.

The output of the receiving block 304 may be connected to a data compression unit 303 which in turn may be connected to a frame constructing and/or sequencing (FC/S) unit 302. The FC/S unit 302 may be connected with its output to a latch 301 which synchronises the data outputted by the FC/S unit 302, with a clock signal provided by a clock source "clck" 311. The FC/S unit 302 may be connected to a control unit 329 which can control settings of the frame construction and sequencing performed by the FC/S device 302, for example in order to comply with a specific protocol to be complied with in a certain communication mode.

The transmission unit 32 may include a latch 321 which may be connected to the line receiver 320. The latch 321 may synchronise the data received at the BB interface with a clock signal. In this example the latch 321 is shown connected with a clock signal input to the clock source 311. The latch 321 may output the synchronised data to a message arbitration (ARB) unit 323. The ARB unit 323 may extract header information from the payload of data packets or frames, for instance in case the communication protocol is a packet or frame based protocol. The ARB unit 323 may decide if the payload data is control data or transmitted data. The ARB 323 may be connected to a control message bus (CMB) 322. The ARB unit 323 may pass the control data to the CMB 322, based on which the CMB may control the appropriate settings for correct functionality. As shown in FIG. 3, the ARB unit 323 may be connected to a data decompression unit 324 which can decompress the received data and output reconstructed original data.

As shown in FIG. 3, the data decompression unit 324 may be connected with its output to a transmission unit 325. The data decompression unit 324 may for example pass the reconstructed original data to the transmission unit 325. The transmission unit may digitally modulate the data outputted by the data decompression unit 324 and convert the digitally modulated data into analogue signals. The transmission unit 325 may for example include one or more digital modulation units (not shown) of which a selected digital modulation unit corresponding to the used communication mode is used. The transmission unit 325 may for example include a 2G modulator suitable for a 2G communication mode, a Square Root of Raised Cosine (SRRC) filter for a 3G communication mode and an LTE modulator for a long term evolution mode. The output of the selected modulator may be connected to a digital-to-analog conversion section (not shown) in the transmission unit 325, which outputs analog signals to a low pass filter unit 326.

The low-pass filter unit 326 may filter the analog signals and input the filtered signals into an RF modulator 327 which, inter alia converts the frequency of the filtered signals into an RF frequency, using a suitable analogue modulation technique, such as frequency modulation, phase modulation, amplitude modulation or a combination thereof. The RF modulator 327 may, as shown, be connected to the antenna 4, e.g. via the power amplifier 6 and/or the antenna switch 5.

Figure 4:
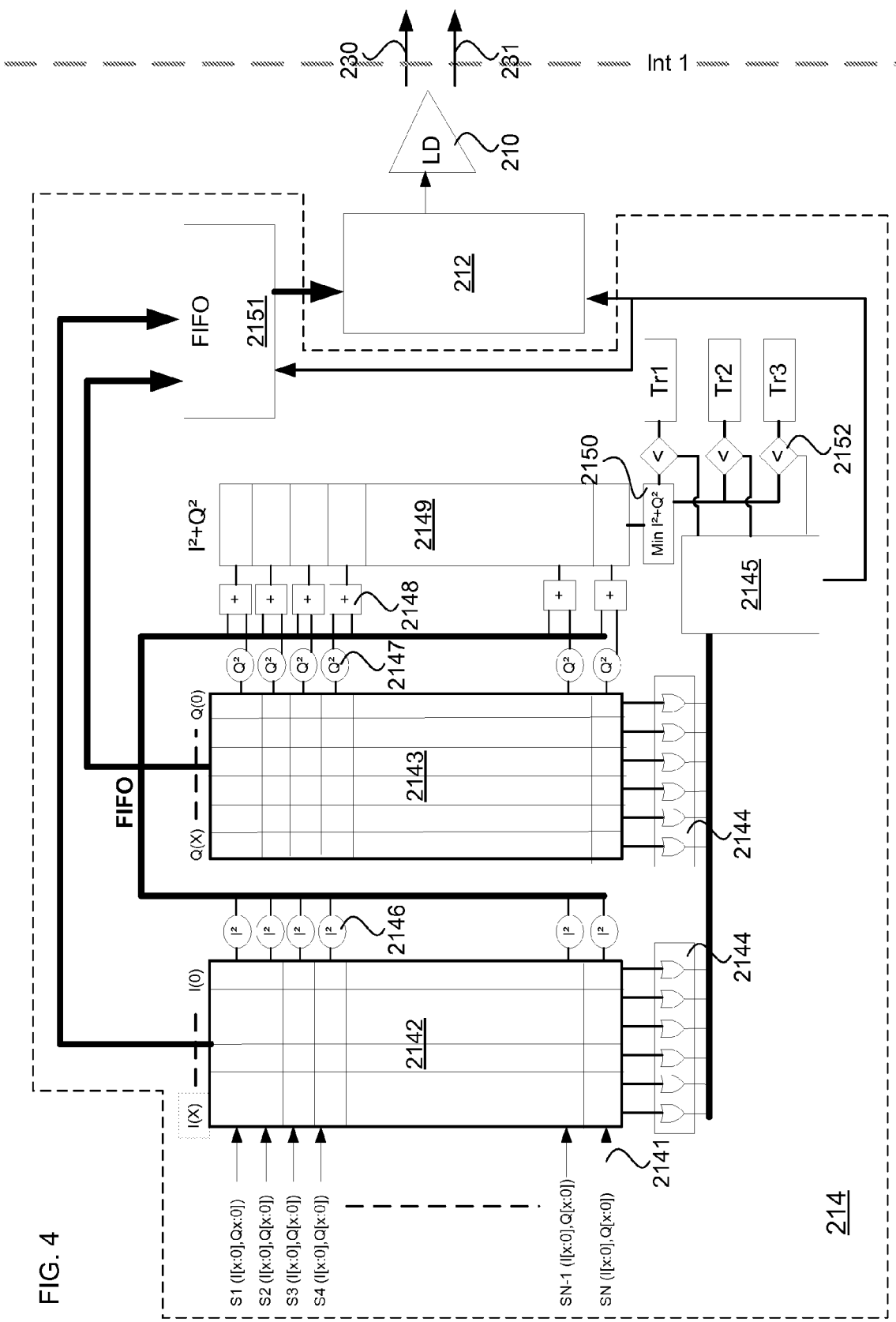
FIG. 4 schematically shows an example of an embodiment of a data compression unit, which can be used in the example of FIG. 2.
Figure 5:
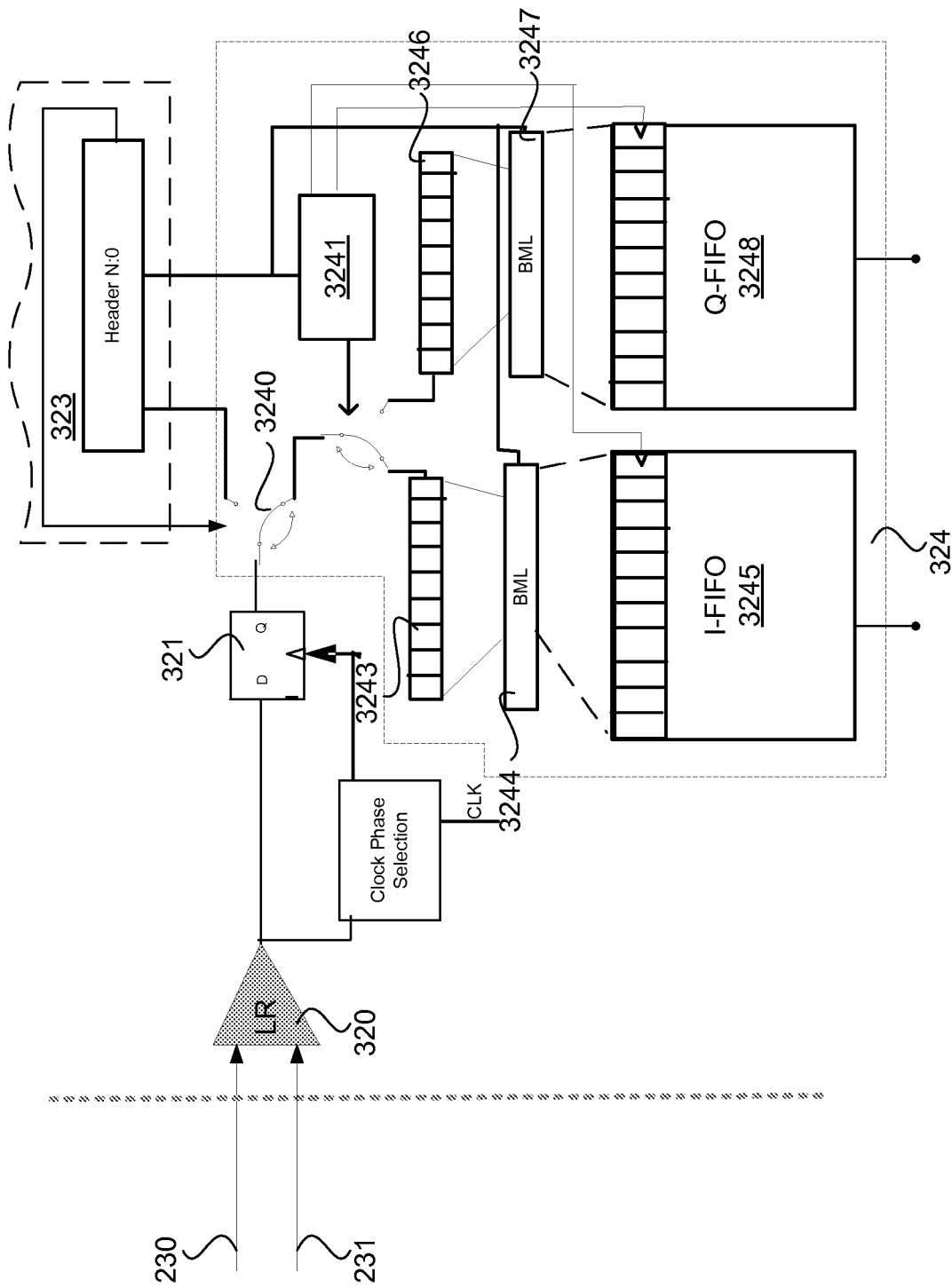
FIG. 5 schematically shows an example of an embodiment of a data decompression unit, which can be used in the example of FIG. 3.

The data compression unit and the data decompression unit may be implemented in any manner suitable for the specific implementation. The data compression unit 214 may be arranged to execute a compression algorithm. The data compression unit may be arranged to execute a lossless compression algorithm or to execute a lossy compression algorithm. Referring to FIGS. 4 and 5, for example, as is explained below in more detail, the data compression unit 214,302 may for example perform a lossless compression on the one or more most significant characters (e.g. in case of binary data on the most significant bits (MSBs) of a sample such as a byte. In case a sign bit is used, this may be excluded from the MSBs that are compressed) and perform a lossy compression algorithm on the least significant characters of a set of characters (e.g. in case of binary data on the least significant bits of a sample such as a byte).

As shown in FIG. 4, for example, the original data may include sets of two or more characters, (e.g. bits). The characters are ordered in samples S1 . . . SN (e.g. bytes) each comprising a sequence of two or more characters (in this example pairs I,Q with values in the range from 0 to x which are represented in binary code. The compression unit may also be used in other applications in the digital domain, for example to compress I-Q data to be transmitted over other types interfaces or to compress I-Q data to be stored on a storage medium. The compression unit may be arranged to compress the original data per set of at least two samples S1, S2, . . . , SN−1, SN. The set may for example include all the samples that are to be included in a single data frame or data packet. The compression unit may for example receive all the data of the set and determine from the received data how each of the samples can be compressed.

The data compression unit 214 may be arranged to determine from the set a position of a character that can be omitted in each of the samples. For example, the data compression unit may be arranged to determine redundancies between the received samples and determine from the redundancies whether one or more of the most significant characters (excluding a character indicating the sign of the sample, such as the sign bit, if used) and/or one or more of the least significant characters of each of the samples can be omitted.

In the shown example, for instance, each samples is formed by an I-Q data pair including an I-component and a Q-component. Each of the I-component and Q-component includes a sequence of bits which represents the value of the I-component and the Q-component. The I-component and the Q-component are to be fed into an inphase (I) or quadrature (Q) path of a quadrature modulation system respectively and indicate the magnitude and sign of the in-phase or I-component of the quadrature or Q component of the quadrature modulation signal respectively.

As shown in the example of FIG. 4, the I-Q pairs in each set may be separated and stored in a respective table 2142, 2143 and be subjected to a test to determine how the sets can be compressed. For example, for the I values in the set, the data compression unit may determine which of the more significant characters are the same in all the samples S1 . . . SN of the set. In the example of FIG. 4, for instance, an array 2144 of OR devices is connected to the respective table 2142, 2432 to determine which of the character positions have the same value for the I-component and the Q-component respectively in all the samples S1 . . . SN. For instance, the most significant position may have the same value (e.g. binary 0 or 1) for all the samples. The outputs of the OR ports in the arrays 2144 are connected to a truncation unit 2145 which determines which of the most significant bits (MSB) can be omitted in all the samples. For example, supposing that the I values for the two most significant I-Q pairs in all the samples have a zero value as MSB, those may be omitted. For example, the truncation control unit 2145 may perform an operation as can be described with the pseudo-code:

```
n=i
for n=i to n=1
{ if OR[output(I_i)]= true
      then omit In
      else {
           keep In
           n=1
      }
  if OR-output(Q_n)= true
      then omit Q_n
      else {
           keep Q_n
           n=1
      }
  n=n−1}
``` in which $I_n$ and $Q_n$ indicated the character position n in the I-component and the Q-component of respectively.

The truncation control unit 2145 may also determine which of the less significant characters can be omitted. As shown, for example, for each of the samples S1 . . . SN the total absolute value $I^2,Q^2$ of the I values or the Q values may be determined by squaring units 2146, 2147 respectively. The total absolute values $I^2,Q^2$ may be added per sample S1 . . . SN by adders 2148 connected to the squaring units 2146, 2147 of a sample S1 . . . SN resulting in a total value $I^2+Q^2$. The determined total values $I^2+Q^2$ may then be stored in a table 2149 connected to the adders 2148 and a minimum value (Min $I^2+Q^2$) may be determined by a search unit 2150.

In the example of FIG. 4, the minimum value is determined after storing the samples in the tables. However, it will be apparent that the minimum value may be determine before the received samples are stored in the tables, for example by positioning squaring units 2146,2147, adders 2148, table 2149 and search unit 2150 in a signal processing direction upstream from the I-table and the Q-table 2142,2143.

It woill be apparent that many of the hardware resources described in this embodiment such as the squaring circuits 2146,2147 could be multiplexed to sequentially square and add all samples as the FIFO is being populated thus minimizing the hardware overhead. Also, the table 2149 which forms an array for the $I^2+Q^2$ results could have the lowest result value stored only as part of this sequential process. For example, two $I^2+Q^2$ result values may be stored only, a current value and a previous lowest value. The previous lowest value may than be replaced when the current value is less than the previous lowest value. When a payload of data processing is complete the previous lowest value may then be reset to a maximally high value thus ensuring correct operation for a following set of data to be processed.

The minimum value may then be inputted to respective comparators 2152. The comparators 2152 may compare the minimum values with thresholds Tr1 . . . Tr3, each corresponding to a respective one of the less significant characters. The comparators 2152 may compare the minimum values with any suitable number of thresholds, for example with two or more thresholds, such as three thresholds. The threshold values may be selected on the basis of a minimum $I^2+Q^2$ result containing enough dynamic range to support a desired Signal to Noise ratio required for reception. For example, a first threshold Tr1 may correspond to the least significant character (I0, Q0), a second threshold Tr2 may correspond to the second least significant character (I1,Q1), a third threshold Tr3 may correspond to the third least significant character (I2, Q2), with the first threshold tr1 being lower than the second Tr2 and the second threshold Tr2 being lower than the third threshold Tr3. The result of the comparison performed by the comparators 2152 may then be inputted to the truncation control unit 2145, which determines the less significant characters that may be omitted. E.g. when the minimum value exceeds a threshold Tr1 . . . Tr3, this implies that all the samples have at least this value and hence that this value is redundant. The truncation control unit 2145 may for example perform an operation which may be described by the pseudocode:

```
for j=1 to n
{ if min I²+Q²>Tr(j)
    then for S=1 to n
        {
        omit character(j)
        }
    else stop
}
```

The data compression unit 214 may include a control input for controlling one or more parameters, such as a compression ratio, the compression algorithm based on a predetermined criterion, such as a data communication protocol used by the radiofrequency module and/or a quality of service requirement. For instance, in the example of FIG. 4, the thresholds Tr1 . . . Tr3 and hence the less significant bits that are removed and therefore the compression ration may be controlled based on the required quality of service or other criterion The truncation control unit 2145 may, as shown in FIG. 4, be connected to a buffer 2151 in which the data stored in the tables 2142, 2143 is fed. The buffer 2151 may as shown be connected with a control input to the truncation control unit 2145 and be controlled via this input by the truncation control unit 2145 to remove the characters in each of the samples S1 . . . SN at the positions indicated by the truncation control unit 2145.

As shown in FIGS. 2 and 3, the wireless communication unit 1 may include a data frame constructing unit 212 for constructing a data frame. The data frame constructing unit may determine how many compressed data samples are to be packed into the frames. The data frame may include a payload part, which includes the compressed data and a non-payload part, which includes supplemental data for handing the data frame. The supplemental data may include decompression information for decompressing the compressed data.

As shown in FIG. 4, the data frame constructing unit 212 may be connected with an input to an output of the data compression unit 214. In the example of FIG. 4, for instance, the data frame constructing unit 212 is connected to the buffer 2151 and to the truncation control unit 2145. The data frame constructing unit 212 can receive the compressed data and the decompression information from the data compression unit 214 and from data frames which comprise the compressed data in the payload and the decompression information in the non-payload, e.g. in the header.

Alternatively the frame constructing and/or sequencing (FC/S) unit 212 may be connected to the I-table 2142 and the Q-table 2143 from which the compressed data can be extracted by using the information from the truncation unit 2145. Thereby, the FIFO 2151 may be omitted and hence the amount of complexity be reduced.

The data decompression unit may be implemented in any manner suitable for the specific implementation. Referring to FIG. 5, an example of a data decompression unit 324 is shown. The data decompression unit may also be used in other applications in the digital domain, for example to decompress I-Q data received via over other types interfaces or to decompress I-Q data stored on a storage medium The data decompression unit 324 may be connected to the lines 230-231 in this example via the line receiver 320 and the latch 321.

As shown, a non-payload reading unit 323 may read the information in the non-payload part, e.g. in this example in the header and once the complete non-payload part is received switch a switch 3240 connected to the latch 321 such that the data is fed into the data decompression unit 324. The data decompression unit 324 may include a compressed sample read controller 3241 which is connected with a control input to the non-payload reading unit 323 and which is connected to a switch in order to control the stream of data such that respective serial to parallel converters 3243, 3246 are filled with a compressed sample. In this example, a separate serial to parallel converter 3243, 3246 is provided for the I-values and the Q-values respectively.

As shown, a respective first in-first out buffer (I-FIFO, Q-FIFO) 3245, 3248 may be provided in which the data in the serial to parallel converter 3243, 3246 is mapped by a mapping logic unit 3244, 3247 which operates in accordance with the information in the non-payload part of the packet (e.g. by mapping a character at position i in the compressed sample to a position i minus omitted more significant characters and adding the appropriate values at the positions of the omitted characters. Thus, the original sample can be obtained and hence the original data be restored. As shown, the FIFO buffers 3245, 3248 may output the restored data to a device further downstream in the data processing direction.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program product, may for instance include program code portions loadable in a memory of a system, device or terminal, which when run perform a method of wireless communication. Such a method may include receiving by the baseband module 2 baseband signals from the radiofrequency module 3 via the communication interface and/or transmitting baseband signals to the radiofrequency module 3 via the communication interface. At a transmitting side of the communication interface original data to be transmitted over the communication interface may be compressed into compressed data. At a receiving side of the communication interface, after transmission the compressed data may be decompressed and the original data be restored.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections. Furthermore, for example, in FIGS. 2 and 3, for sake of simplicity only a single receiver path to the antenna(e) and a single transmit path to the antenna(e) are shown. However it will be appreciated that more transmit and receive paths, (and components such as the LNA 307 connected to the contacts) may be present, for example to provide signals or receive signals from different bands and/or antenna. Also, this invention could be used as an algorithm for compression and decompression of I/Q data in other applications in the digital domain, for example to transmit the I/Q data over other types interfaces.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the clock circuit may be provided on a different piece of silicon than the receiving units 20, 30 or the transmission units 21, 32. Also, devices functionally forming separate devices may be integrated in a single physical device. For example, the RF module and the baseband module may be provided as a single integrated circuit package.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A wireless communication unit, comprising:
a baseband module;
a radio frequency module;
a communication interface connecting said baseband module to said radio frequency module, for communicating data from said baseband module to said radio frequency module and/or vice versa;
wherein:
said communication interface includes at least one data compression arrangement, for compressing original data to be transmitted over the communication interface, from a transmitting side of the communication interface to a receiving side of the communication interface, into compressed data and decompressing said compressed data after transmission and restoring the original data, said data compression arrangement including:
a data compression unit at said transmitting side of the communication interface, and
a data decompression unit at said receiving side of the communication interface;
said original data comprises a plurality of pairs of I-values and Q-values, each member of each pair of the plurality of pairs comprising a sequence of bits of length x; and
said compressing comprises:
calculating a minimum value of $I^2+Q^2$ over all of the plurality of pairs of I-values and Q-values;
for each position of a bit from 1 to x, determining a threshold, where 1 represents the most significant position and x represents the least significant position;
determining that the minimum value exceeds a threshold for a jth position; and
removing from each sample of a plurality of samples in said original data the bits from the jth position to the xth position.

2. A wireless communication unit as claimed in claim 1, wherein said baseband module is provided at a baseband side of said communication interface and said radio frequency module is provided at a radio frequency side of said communication interface, and
wherein said at least one data compression arrangement includes:
a first data compression arrangement for compressing original data to be transmitted over the communication interface from said baseband side to said radio frequency side into compressed data and decompressing said compressed data after transmission and restoring the original data;
a second data compression arrangement for compressing original data to be transmitted over the communication interface from said radio frequency side to said baseband side into compressed data and decompressing said compressed data after transmission and restoring the original data.

3. A wireless communication unit as claimed in claim 2, wherein said data compression unit is arranged to execute a compression algorithm, and said data compression unit includes a control input for controlling compression ratio of said compression algorithm based on a data communication protocol used by the radio frequency module and/or a quality of service requirement.

4. A wireless communication unit as claimed in claim 1, including a data frame constructing unit for constructing a data frame, said data frame including a payload part which includes the compressed data and a non-payload part including supplemental data for handling the data frame, said supplemental data including decompression information for decompressing the compressed data, said data frame constructing unit being connected with an input to an output of said data compression unit, for receiving the compressed data and said decompression information.

5. A wireless communication unit as claimed in claim 1, wherein said data compression unit is arranged to execute a compression algorithm, and said data compression unit includes a control input for controlling compression ratio of said compression algorithm based on a data communication protocol used by the radio frequency module and/or a quality of service requirement.

6. A wireless communication unit as claimed in claim 1 wherein said data compression unit is arranged to execute a lossless compression algorithm or to execute a lossy compression algorithm.

7. A wireless communication unit as claimed in claim 1, wherein said original data includes at least one set of a predetermined number of characters, and said data compression unit is arranged to compress said original data per set, after all characteristics of a set have been received by said data compression unit.

8. A wireless communication unit as claimed in claim 7, wherein said set includes at least two samples, each sample including two or more characters and said data compression unit is arranged to compress the original data in each of said samples in the same manner.

9. A wireless communication unit as claimed in claim 1, wherein said data represents one or more of: voice, video data.

10. A wireless communication unit as claimed in claim 1, wherein said data compression unit and/or said data decompression unit can be disabled when desired.

11. A wireless communication unit as claimed in claim 1, arranged to operate in accordance with at least one communication protocol in the group consisting of: CDMA, EGPRS and WCDMA, WiMax, WiBro, LTE, IEEE 802.11, WiFi and 4G protocols.

12. A baseband module for a wireless communication unit as claimed in claim 1, including a data compression unit and/or a data decompression unit.

13. A radio frequency module for a wireless communication unit as claimed in claim 1, including a data compression unit and/or a data decompression unit.

14. A wireless terminal, including a wireless communication unit and/or a baseband module and/or a radio frequency module as claimed in claim 1.

15. The wireless communication unit of claim 1, the compressing further comprising:
  determining that one or more of the most significant characters in each of the samples, excluding a sign, is common to each of the plurality of pairs of I-values and Q-values; and
  removing the one or more significant characters from each of the plurality of pairs of I-values and Q-values, based upon the determining.

16. A method for wireless communication, comprising:
  receiving by a baseband module baseband signals from a radio frequency module via a communication interface and/or transmitting baseband signals to said radio frequency module via said communication interface;
  compressing at a transmitting side of the communication interface original data to be transmitted over the communication interface into compressed data by a lossy compression algorithm; and
  decompressing the compressed data and restoring the original data at a receiving side of the communication interface;
  wherein:
  said original data comprises a plurality of pairs of I-values and Q-values, each member of each pair of the plurality of pairs comprising a sequence of bits of length x; and
  said compressing comprises:
    calculating a minimum value of $I^2+Q^2$ over all of the plurality of pairs of I-values and Q-values;
    for each position of a bit from 1 to x, determining a threshold, where 1 represents the most significant position and x represents the least significant position;
    determining that the minimum value exceeds a threshold for a jth position; and
    removing from each sample of a plurality of samples in said original data the bits from the jth position to the xth position.

17. The method of claim 16, the compressing further comprising:
  determining that one or more of the most significant characters in each of the samples, excluding a sign, is common to each of the plurality of pairs of I-values and Q-values; and
  removing the one or more significant characters from each of the plurality of pairs of I-values and Q-values, based upon the determining.

18. A computer program product, including program code portions loadable in a memory of a system, device or terminal, for executing a method when run by said system, device or terminal, the method comprising:
  receiving by a baseband module baseband signals from a radio frequency module via a communication interface and/or transmitting baseband signals to said radio frequency module via said communication interface;
  compressing at a transmitting side of the communication interface original data to be transmitted over the communication interface into compressed data; and
  decompressing the compressed data and restoring the original data at a receiving side of the communication interface; wherein:
  the original data comprises a plurality of samples, each sample comprising a sequence of characters; and
  the compressing comprises:
    determining that one or more of the most significant characters, excluding a sign, is common to each sample of the plurality of samples; and
    removing the one or more most significant characters common to each sample from each of the plurality of samples; and wherein:
  each sample is formed by an I-Q data pair including an I-component and a Q-component.

19. The computer program product of claim 18, wherein:
  each sample of the plurality of samples comprises a sequence of bits; and
  the determining comprises determining a number of leading zeroes common to all of the plurality of samples.

* * * * *